(12) United States Patent
Bertze et al.

(10) Patent No.: US 9,413,900 B2
(45) Date of Patent: Aug. 9, 2016

(54) METHOD AND APPARATUS FOR ONLINE CHARGING OF PRE-FETCHED CONTENT

(71) Applicant: Telefonaktiebolaget L M Ericsson (publ), Stockholm (SE)

(72) Inventors: Åsa Bertze, Spånga (SE); Icaro L. J. Da Silva, Sollentuna (SE); Jing Fu, Solna (SE); Gunnar Mildh, Sollentuna (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 14/222,903

(22) Filed: Mar. 24, 2014

(65) Prior Publication Data

US 2015/0271344 A1  Sep. 24, 2015

(51) Int. Cl.
*H04M 15/00* (2006.01)
*H04L 12/14* (2006.01)
*H04L 29/08* (2006.01)

(52) U.S. Cl.
CPC .......... *H04M 15/888* (2013.01); *H04L 12/1407* (2013.01); *H04L 12/1467* (2013.01); *H04M 15/64* (2013.01); *H04L 12/1435* (2013.01); *H04L 12/1439* (2013.01); *H04L 67/22* (2013.01); *H04L 67/30* (2013.01)

(58) Field of Classification Search
CPC .......... G06Q 30/0269; G06Q 30/0261; G06Q 30/0267; G06Q 30/0255; G06Q 30/04; G06F 17/30772; G06F 21/10; G06F 17/30088; G06F 17/30194; G06F 17/30761; G06F 3/0482; G06F 3/04842; G06F 12/0844
USPC .......................................................... 455/408
See application file for complete search history.

(56) References Cited

U.S. PATENT DOCUMENTS

| 2007/0239611 | A1* | 10/2007 | Blum ............................. 705/51 |
| 2010/0064304 | A1 | 3/2010 | Ishizaki et al. |
| 2010/0161756 | A1* | 6/2010 | Lewis ................ H04N 7/17318 709/217 |
| 2013/0176846 | A1 | 7/2013 | Callard et al. |

OTHER PUBLICATIONS

Da Silva, I. L. J., et al., "Method and Apparatus for Pre-Fetched Content Charging," U.S. Appl. No. 14/132,478, filed Dec. 18, 2013.
(Continued)

*Primary Examiner* — Kwasi Karikari
(74) *Attorney, Agent, or Firm* — Murphy, Bilak & Homiller, PLLC (57) ABSTRACT

In one aspect of the teachings herein, an Application Function, AF, in a wireless communication network is configured to support online charging for the consumption of content that has been pre-fetched to a wireless device via the network. The AF functionality thus provides a mechanism by which content may be pre-fetched to a wireless device in advance of charging for that content, while reliably conditioning the later consumption of that content at the wireless device on the online charging decisions made by an online charging system. In another aspect, a wireless device is configured to send a consumption request for pre-fetched content towards such an AF and condition its consumption of the pre-fetched content on the consumption response returned to it.

16 Claims, 6 Drawing Sheets

(56) References Cited

OTHER PUBLICATIONS

Third Generation Partnership Project, "3GPP TS 23.203 V12.4.0 (Mar. 2014)," 3rd Generation Partnership Project; Technical Specification Group Services and System Aspects; Policy and charging control architecture (Release 12). Mar. 2014. pp. 1-218.

Third Generation Partnership Project, "3GPP TS 32.240 V12.2.0 (Sep. 2013)," 3rd Generation Partnership Project; Technical Specification Group Services and System Aspects; Telecommunication management; Charging management; Charging architecture and principles (Release 12). Sep. 2013. pp. 1-48.

Third Generation Partnership Project, "3GPP TS 32.296 V12.0.0 (Sep. 2013)," 3rd Generation Partnership Project; Technical Specification Group Services and System Aspects; Telecommunication management; Charging management; Online Charging System (OCS): Applications and interfaces (Release 12). Sep. 2013. pp. 1-88.

Hakala, H. et al. "Diameter Credit-Control Application." Internet Engineering Task Force, Network Working Group, RFC 4006, Standards Track. Aug. 2005, pp. 1-102.

* cited by examiner

METHOD AND APPARATUS FOR ONLINE CHARGING OF PRE-FETCHED CONTENT

TECHNICAL FIELD

The present invention generally relates to communication networks and particularly relates to online charging for pre-fetched content in such networks.

BACKGROUND

The Technical Specification TS 23.203 provides an overview of the entities involved in charging and policy control, in a Third Generation Partnership Project, 3GPP, context. 3GPP offline charging, and Policy Control and Enforcement Function, PCEF, generates charging events based on packet data usage and charging policies as provided by a Policy and Charging Rules Function, PCRF. The charging events are sent to the offline charging system, where they are formatted into Charging Data Records, CDRs, and sent further on to a billing system.

However, online charging for packet data requires continuous contact between an online charging system and a Charging Trigger Function, CTF, while data is being transferred. In this context, the CTF corresponds to a PCEF and exchanges information with an online charging system via a defined interface. Under this arrangement, data transfer is stopped, for example, responsive to the depletion of credit in the user account associated with ongoing packet data consumption.

For more details, see 3GPP TS 32.240 and 3GPP TS 32.296. Broadly, however, online charging in a 3GPP network generally follows the following operating flow: (1) charging events are forwarded to an Online Charging Function, OCF, to obtain authorization for a chargeable event/network resource usage, as requested by a user in the network; (2) the CTF delays the actual resource usage until permission has been granted by the OCS; (3) the CTF tracks the availability of resource usage permission, "quota supervision," during the network resource usage; (4) the CTF enforces termination of the end user's network resource usage when permission by the OCS is not granted or expires.

With the above overall functionality in mind, an OCS in a 3GPP network provides an "Event Based Charging Function" or EBCF, which performs event based charging and credit control, e.g. content charging for Short Messaging Services or SMS. The OCS further provides a Session Based Charging Function or SBCF, which performs session based charging and credit control, e.g., for voice calls. Still further, the OCS provides a Rating Function that performs unit determination, which is a type of rating. The Rating Function is configured to handle a wide variety of ratable instances, such as rating of volume in terms of granted units or money, rating of time and rating of events, e.g. based on charging of web contents or SMS.

Upon the reception of an online charging request, i.e. a Credit Control Request or CCR, the EBCF/SBCF contacts the Rating Function to request price or tariff information regarding the online charging request. The input to the Rating Function includes: a Rating Request Type indicating a Price Request or a Tariff Request; Service-specific data, such as a Service-ID, Time/Date of Service usage, Quality-of-Service, QoS, requirement, etc.; Subscriber-specific static data, such as Subscriber-ID, Partner-ID, additional tariff information, and possibly other static data; and Subscriber specific dynamic data, such as Account Balances, Subscriber Counters used per time-unit, and possibly other dynamic data.

Correspondingly, the output of the Rating Function includes: a Rating Request Type Response, including Price or Service units or Tariff information; Charge and Recharge Information, such as value for accounts and Subscriber Counters; Tax information, such as the tax value for price or service units for tariff determination; and Detailed information to be used for invoice generation. Based on the response from the Rating Function, the EBCF/SBCF sends an online charging response, i.e. a Credit Control Answer, CCA, to the network node that sent the CCR request. CCR message formats are defined according to IETF RFC 4006.

SUMMARY

In one aspect of the teachings herein, an Application Function, AF, in a wireless communication network is configured to support online charging for the consumption of content that has been pre-fetched to a wireless device via the network. The AF functionality thus provides a mechanism by which content may be pre-fetched to a wireless device in advance of charging for that content, while reliably conditioning the later consumption of that content at the wireless device on the online charging decisions made by an online charging system. In another aspect, a wireless device is configured to send a consumption request for pre-fetched content towards such an AF and condition its consumption of the pre-fetched content on the consumption response returned to it.

In one embodiment, a method of supporting online charging for content that was pre-fetched to a wireless device via a communication network is implemented at a network node associated with the communication network. The method includes receiving a consumption request indicating a requested consumption for at least a portion of the pre-fetched content at the wireless device and initiating a credit control procedure towards an online charging system in response to receiving the consumption request. The credit control procedure includes identifying the requested consumption to the online charging system in an online charging request sent from the network node to the online charging system and receiving an online charging response from the online charging system indicating whether or to what extent the requested consumption is authorized. Further, the method includes sending a consumption response for the wireless device granting or denying all or a portion of the requested consumption, according to the charging response.

In a related example, a network node is configured for operation as an Application Function, AF, in a communication network and is further configured to support online charging for content that was pre-fetched to a wireless device via the communication network. The network node includes a communication interface and an associated processing circuit. The processing circuit is configured to receive a consumption request via the communication interface, where the consumption request indicates a requested consumption for at least a portion of the pre-fetched content at the wireless device. The processing circuit is further configured to initiate a credit control procedure towards an online charging system in response to receiving the consumption request.

For the initiating, the processing circuit is configured to identify the requested consumption to the online charging system in an online charging request sent from the network node to the online charging system via the communication interface and receive an online charging response from the online charging system via the communication interface. The charging response indicates whether or to what extent the requested consumption is authorized and the processing circuit is configured to send a consumption response for the wireless device via the communication interface, where the consumption response grants or denies all or a portion of the requested consumption, according to the charging response.

In an example embodiment on the device side, a method is carried out at a wireless device having pre-fetched content stored therein. The method includes sending a consumption request to an AF node in a communication network, where the consumption request indicates a requested consumption for at least a portion of the pre-fetched content at the wireless device, and further includes receiving a consumption response from the AF node that indicates whether or not the requested consumption is authorized. The device-side method further includes initiating the requested consumption of the pre-fetched content at the wireless device conditioned on the consumption response.

In a corresponding example embodiment, a wireless device includes a communication interface that is configured to communicatively couple the wireless device to a communication network, a storage device that is configured to store content that is pre-fetched to the wireless device, and a processing circuit that is configured to send a consumption request via the communication interface, where the consumption request is sent towards an AF node in the communication network and indicates a requested consumption for at least a portion of the pre-fetched content. Further, the processing circuit is configured to receive a consumption response from the AF node that indicates whether or not the requested consumption is authorized, and to initiate the requested consumption of the pre-fetched content from the storage device, conditioned on the consumption response.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
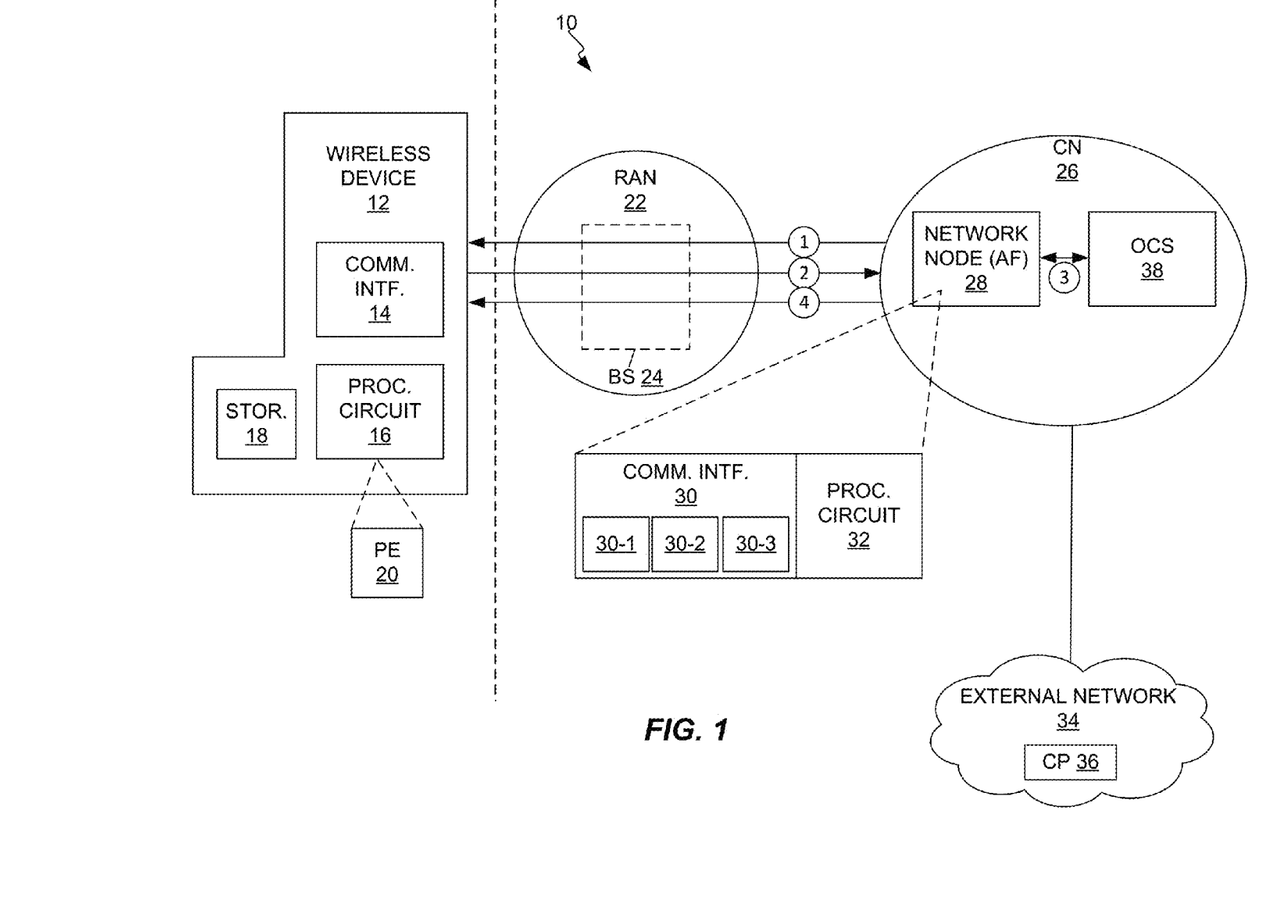
FIG. 1 is a block diagram of one embodiment of a communication network and an associated wireless device, as configured according to the teachings herein.

FIG. 1 illustrates an example embodiment of a wireless communication network 10—hereafter "network 10"—and an example embodiment of a wireless device 12. The example wireless device 12 includes a communication interface 14, a processing circuit 16 and associated storage 18. The processing circuit 16 comprises fixed processing circuitry, programmed circuitry, or a combination of both. In one example, the processing circuit 16 comprises computer circuitry, such as one or more microprocessor-based circuits, DSP-based circuits, an FPGA or ASIC, or other digital processing circuit.

In the illustrated embodiment, the processing circuit implements a pre-fetching element 20. In some embodiments, the pre-fetching element 20 and other functional circuitry within the processing circuit 16 is implemented—i.e., specially adapted—via the execution of computer program instructions from a computer program stored in the storage 18. The storage 18 comprises one or more memory devices, potentially of different types, e.g., FLASH, EEPROM, SRAM, etc. Broadly, the storage 18 in some embodiments provides for non-transitory storage of a computer program the execution of which configures the wireless device 12 according to the device-side teachings herein.

However, before delving into example embodiments of the device-side teachings, it is helpful to discuss the example network 10. In the diagram, the example network 10 includes a Radio Access Network, RAN, 22, which includes one or more base stations 24. Moreover, the RAN 22 communicatively couples to a Core Network, CN, 26, which includes a network node 28 configured to operate as an Application Function or AF. The network node 28 in the example embodiment includes a communication interface 30, which may include multiple interfaces, e.g., 30-1, 30-2, and 30-3. The network node 28 further includes a processing circuit 32. The processing circuit 32 comprises fixed processing circuitry, programmed circuitry, or a combination of both. In one example, the processing circuit 32 comprises computer circuitry, such as one or more microprocessor-based circuits, DSP-based circuits, an FPGA or ASIC, or other digital processing circuit. In at least one embodiment, such circuitry is configured according to the network-side teachings herein based on the execution of computer program instructions stored in a computer-readable medium in or accessible to the processing circuit 32.

With reference to both the RAN 22 and the CN 26 of the network 10, it will be appreciated that the network 10 communicatively couples the wireless device 12 to one or more external networks 34, such as the Internet or another Packet Data Network. The external network(s) 34 include or provide access to a Content Provider, CP, 36, which acts as a source of electronic content, referred to simply as "content" herein, such as movies, songs, podcasts, web videos or pages, etc. While not explicitly shown, the network 10 itself may provide access to such content, e.g., via caching of content within the network 10.

Indeed, although the source or originating location of content that is fetched or pre-fetched to the wireless device 12 may bear in some sense on the how charges are assessed for the consumption of that content, the teachings herein are not limited to sourcing content from external content providers 36 located in networks 34 that are external to the network 10.

With the example details of FIG. 1 in mind, in some embodiments, the network node 28 is configured for operation as an AF in the network 10, and is configured to support online charging for content that was pre-fetched to a wireless device 12 via the network 10. Here, "pre-fetched content" is content that is sent to and stored by the wireless device 12 in advance of charging for that content. Thus, to the extent that the user of the wireless device 12 never consumes the pre-fetched content, there may be no charges assessed and the pre-fetched content may expire or otherwise be deleted at some later time.

With these points in mind, the example network node 28 includes the aforementioned communication interface and the aforementioned processing circuit 32. The processing circuit 32 is configured to receive a consumption request via the communication interface 30, where the consumption request indicates a requested consumption for at least a portion of content that was pre-fetched to the wireless device 12—i.e., the consumption request is for pre-fetched content stored at the wireless device 12. Signaling representing an example consumption request is denoted by the circled numeral "2" in the diagram. Such signaling follows, for example, at some indeterminate time after the AF of the network node 28 has pre-fetched content to the wireless device 12 for storage in/by the pre-fetching element 20 of the wireless device 12. The pre-fetching operation/signaling is denoted in FIG. 1 by the circled numeral "1."

The processing circuit 32 of the network node 28 is further configured to initiate a credit control procedure towards an online charging system, OCS, 38 included in the CN 26—this procedure is denoted by the circled numeral "3" in the diagram. The credit control procedure is initiated in response to receiving the consumption request. For initiating the credit control procedure, the processing circuit 32 is configured to identify the requested consumption to the OCS 38 in an online charging request sent from the network node 28 to the OCS 38 via the communication interface 30, and to receive an online charging response from the OCS 38 via the communication interface 30.

The charging response indicates whether or to what extent the requested consumption is authorized, and, correspondingly, the processing circuit 32 is configured to send a consumption response for the wireless device 12 via the communication interface 30. Here, the consumption response grants or denies all or a portion of the requested consumption, according to the charging response. As such, the network node 28, with its configured processing circuit 32, supports online charging for content that has been previously fetched—pre-fetched—to a wireless device 12.

In some embodiments, the consumption request indicates one or more charging factors affecting charging assessment by the OCS 38 with respect to the requested consumption. Here, the processing circuit 32 is configured to indicate the one or more charging factors to the OCS 38 via the online charging request. In the same or other embodiments, the one or more charging factors comprise at least one of: an indication of the time at which the pre-fetched content was pre-fetched to the wireless device 12, an indication of the Radio Access Technology, RAT, type used to pre-fetch the pre-fetched content to the wireless device 12, an indication of the identity of the RAN used to pre-fetch the pre-fetched content to the wireless device 12, an indication of the location of the wireless device 12 when the pre-fetched content was pre-fetched to the wireless device 12, and an indication of network loading for a service area in which the wireless device 12 was located when the pre-fetched content was pre-fetched to the wireless device 12.

In the same or other embodiments, the pre-fetched content is divided or quantized into chargeable "chunks." Here, the consumption request comprises a chunk-specific consumption request. Correspondingly, the processing circuit 32 is configured to indicate the chunk-specific consumption request in the online charging request.

In the same or other embodiments, the processing circuit 32 is configured to indicate to the OCS 38 at least one of the following charging factors associated with the consumption request: a data amount or size corresponding to the requested consumption, a length or duration of playback associated with the requested consumption, an indication of a particular portion or segment of the pre-fetched content targeted by the requested consumption, and a Radio Access Network, RAN, identity or type corresponding to a current location of the wireless device 12.

In the same or other embodiments, the processing circuit 32 is configured to receive a pre-fetching request—see Item 1 in the diagram—sometime before receiving the consumption request—see Item 2 in the diagram. The pre-fetching request requests pre-fetching of content to the wireless device 12. Here, the content is referred to as "pre-fetched content" upon completion of pre-fetching to the wireless device 12. In such embodiments, the processing circuit 32 is configured to initiate a credit balance check with the OCS 38 responsive to receiving the pre-fetching request, and to condition the requested pre-fetching of the content to the wireless device 12 on a credit balance response received from the OCS 38.

For example, in one or more such embodiments of pre-fetching control, the processing circuit 32 is configured to condition the requested pre-fetching of the content to the wireless device 12. In particular, the processing circuit 32 conditions pre-fetching of content to the wireless device 12 by at least one of: limiting an amount of the content that is pre-fetched to the wireless device 12 according to a credit balance indicated by the credit balance response, authorizing the requested pre-fetching of the content to the wireless device 12 if the indicated credit balance is above a first threshold amount, and denying the requested pre-fetching of the content to the wireless device 12 if the indicated credit balance is below a second threshold amount. In the same or a related embodiment, for the case where the requested pre-fetching is at least partially allowed, the processing circuit 32 is configured to indicate the requested pre-fetching to a Policy and Charging Rules Function, PCRF, node, which is not shown in FIG. 1, and to initiate the requested pre-fetching.

Figure 2:
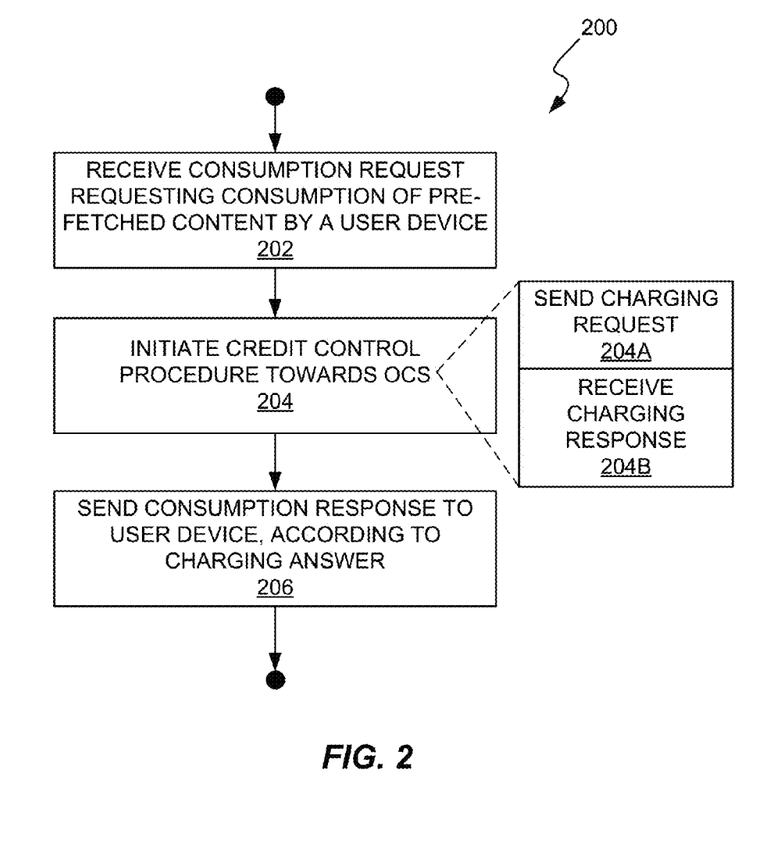
FIG. 2 is a logic flow diagram of one embodiment of a method at a network node, for supporting online charging for a requested consumption of pre-fetched content at a wireless device.

FIG. 2 illustrates one embodiment of a method 200 of network-side processing, as implemented at a network node 28, for supporting online charging for content that was pre-fetched to a wireless device 12 via the network 10. Those of ordinary skill in the art will appreciate that one or more operations of the method 200 may be performed in an order other than that suggested by FIG. 2 and/or may be repeated or otherwise performed as needed for multiple wireless devices 12, with respect to any variety of pre-fetched content.

In the illustrated example, the method 200 includes receiving (Block 202) a consumption request indicating a requested consumption for at least a portion of the pre-fetched content at the wireless device 12, and initiating (Block 204) a credit control procedure towards an OCS 38 in response to receiving the consumption request. The initiating includes identifying (Block 204A) the requested consumption to the OCS 38 in an online charging request sent from the network node 28 to the OCS 38, and receiving (Block 204B) an online charging response from the OCS 38 indicating whether or to what extent the requested consumption is authorized. The method 200 further includes sending (206) a consumption response for the wireless device 12 granting or denying all or a portion of the requested consumption, according to the charging response.

Figure 3:
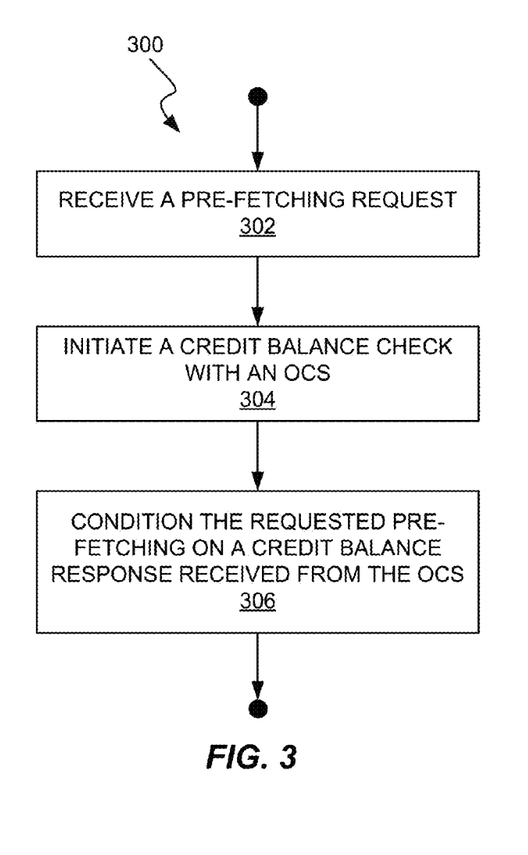
FIG. 3 is a logic flow diagram of a method at a network node, for controlling pre-fetching of content to a wireless device.

FIG. 3 illustrates another method 300 that the network node 28 is configured to perform in one or more embodiments. It may be that the method 300 is performed as an extension of or integral part of the method 200, i.e., as precursor operations performed in advance of the method steps illustrated in FIG. 2. However, it is also recognized herein that the method 300 may be performed independent from the method 200 and broadly offers an advantageous mechanism for conditioning pre-fetching requests on, e.g., a subscriber account balance, as determined by the OCS 38.

The method 300 includes receiving (Block 302) a pre-fetching request, requesting pre-fetching of content to the wireless device 12, where the content "becomes" pre-fetched content upon completion of pre-fetching to the wireless device 12. The method 300 further includes initiating (Block 304) a credit balance check with the OCS 38 responsive to receiving (Block 302) the pre-fetching request, and conditioning (Block 306) the requested pre-fetching of the content to the wireless device 12 on a credit balance response received from the OCS 38.

In at least one embodiment, the conditioning operation (Block 306) comprises at least one of: limiting an amount of the content that is pre-fetched to the wireless device 12 according to a credit balance indicated by the credit balance response, authorizing the requested pre-fetching of the content to the wireless device 12 if the indicated credit balance is above a first threshold amount, and denying the requested pre-fetching of the content to the wireless device 12 if the indicated credit balance is below a second threshold amount. Still further, for the case where the requested pre-fetching is at least partially allowed, one or more embodiments of the method 300 include the further step of indicating the requested pre-fetching to a PCRF node and initiating the requested pre-fetching.

As with the method 200, the processing circuit 32 may be configured programmatically to implement the method 300, either as an extension to or independent from the method 200. In embodiments where the method 300 is implemented as an extension of the method 200, it will be appreciated that the method 300 is performed in advance of receiving the consumption request illustrated in Block 202 of FIG. 2.

Figure 4:
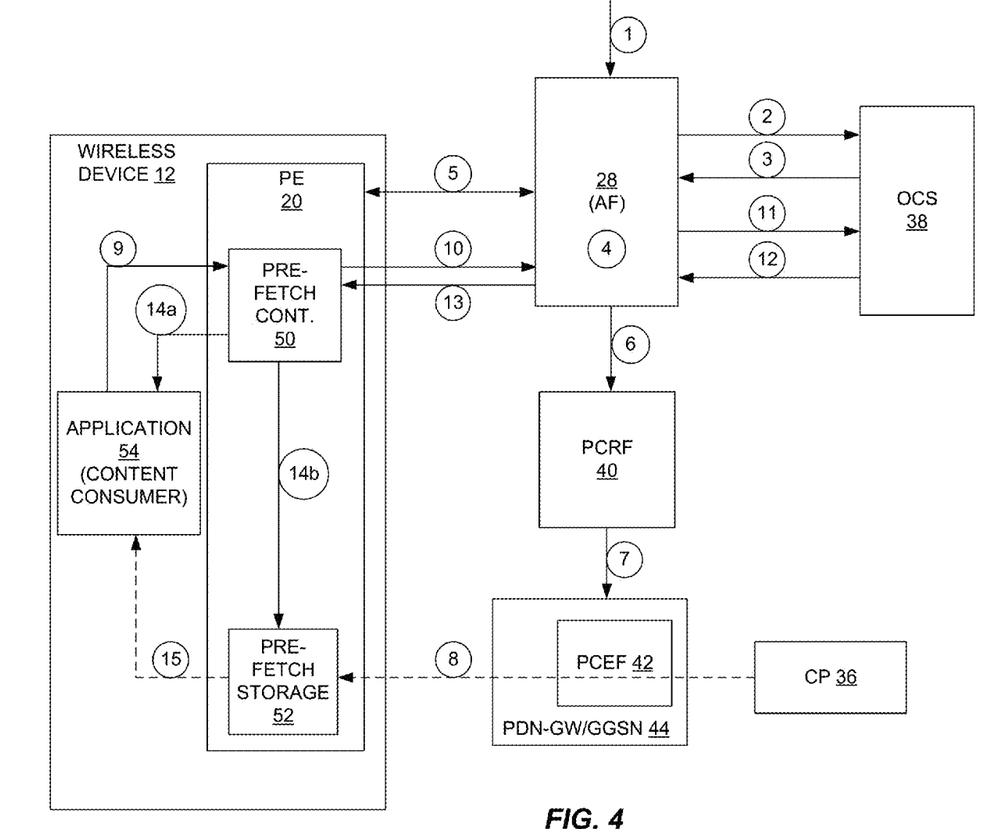
FIG. 4 is a block diagram of example details for an embodiment of a communication network and an associated wireless device, as configured according to the teachings herein.

As for example details on the device side, FIG. 4 illustrates the wireless device 12 in one or more embodiments, and further provides an overall example of signaling involving various nodes in the network 10, for carrying out the methods 200 and 300 as described above. Although not shown explicitly in FIG. 4, the example wireless device 12 includes the aforementioned communication interface 14, which is configured to communicatively couple the wireless device 12 to a network 10. Further, the pre-fetching element 20—PE 20—includes a pre-fetching function 50 and a storage device 52 for storing pre-fetched content, e.g., secure non-volatile memory. The wireless device 12 further includes an application 54, which is, for example, functionally realized via the execution of an application program running on an applications processor within the wireless device 12.

As noted, the PE 20 is implemented via the aforementioned processing circuit 16 and communicates with the network 10 through the aforementioned communication interface 14. Thus, with broader reference to these circuits, the communication interface is configured to communicatively couple the wireless device 12 to the network 10 and the processing circuit 16 is configured to send a consumption request via the communication interface 14. The consumption request is sent towards a network node 28 in the network 10 and indicates a requested consumption for at least a portion of the pre-fetched content. As the network node 28 implements an AF, it is also referred to as an AF node 28.

The processing circuit 16 is further configured to receive a consumption response from the AF node 28 that indicates whether or not the requested consumption is authorized, and to initiate the requested consumption of the pre-fetched content from the storage device 52, conditioned on the consumption response. With momentary reference to FIG. 5, one sees an example device-side method 500, such as implemented via programmatic configuration of the processing circuit 16.

Figure 5:
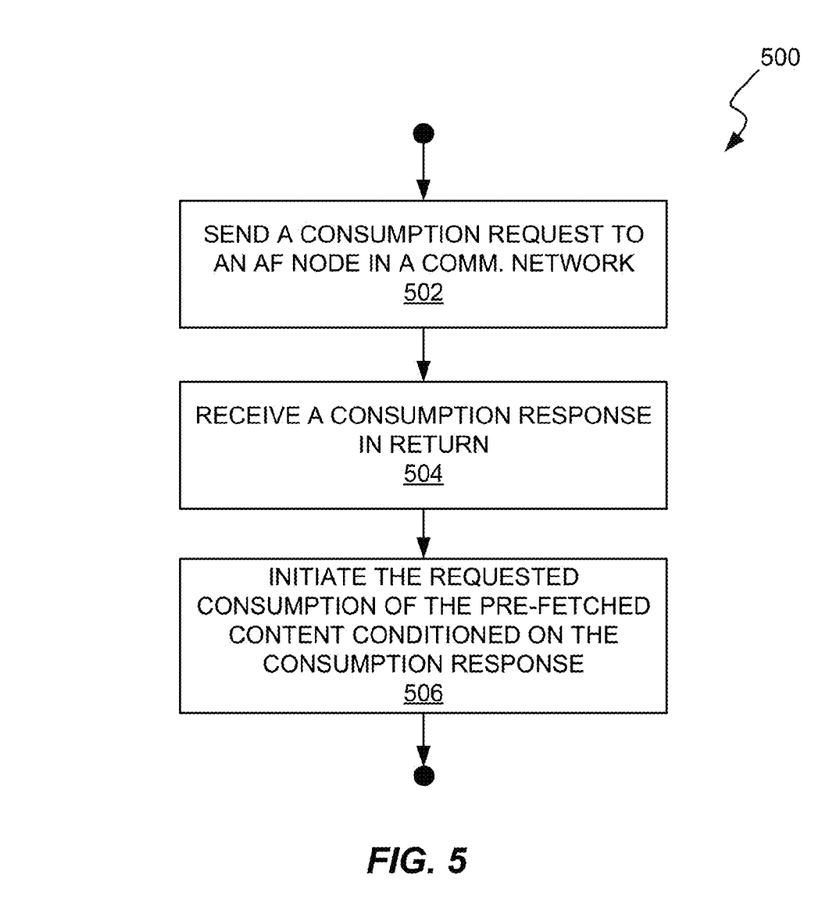
FIG. 5 is a logic flow diagram of a method at a wireless device, of conditionally consuming pre-fetched content stored at the wireless device, according to credit or charging authorization signaling from a communication network.

The method 500 is carried out with the assumption that the device 12 has pre-fetched content stored in it, and with the assumption that the pre-fetched content was not charged to the subscriber account associated with the wireless device 12 in conjunction with the pre-fetching. In that context, the method 500 includes sending (Block 502) a consumption request to an AF node 28 in a network 10. The consumption request indicates a requested consumption for at least a portion of the pre-fetched content at the wireless device 12, and the method 500 further includes receiving (Block 504) a consumption response from the AF node 28 that indicates whether or not the requested consumption is authorized, and initiating (Block 506) the requested consumption of the pre-fetched content at the wireless device 12 conditioned on the consumption response.

Now turning back to FIG. 4, in addition to the further wireless-device example details depicted in FIG. 4, one sees further example network details. These further details include illustrating a PCRF node 40, a Policy Control and Enforcement, PCEF, node 42, such as may be implemented in or with a Packet Data Network, PDN, Gateway, GW, Gateway GPRS Support Node, PDN-GW/GGSN 44.

Of particular interest, FIG. 4 enumerates example signaling flows as at issue in the performance of the methods 200, 300 and 500 illustrated herein using the circled numerals 1-13, 14a, 14b, and 15. These circled numerals are used to denote steps, e.g., "Step 1," "Step 2," and so on.

With that arrangement in mind, at Step 1, the pre-fetching AF node 28 receives a request to pre-fetch some content X for a specific wireless device 12, which may be a 3GPP UE, for example. The request comes, for example, from a content prediction algorithm in the network 10, from an Over-The-Top, OTT, content provider wanting to push some content to the wireless device 12, or from an application 54 running in the wireless device 12 that sends application signaling.

At Step 2, the pre-fetching AF node 28 optionally performs a credit balance check towards the OCS 38, in which case at Step 3 the AF node 28 receives a credit balance check response from the OCS 38, and at Step 4 the AF node 28 decides if the content can be pre-fetched or not towards the wireless device 12. The decision is based on the response from the OCS 38, so that if the subscriber associated with the wireless device 12 has little or no credit available in the associated subscriber account, then pre-fetching of the content may be denied, or less content may be pre-fetched to the wireless device 12.

This condition pre-fetching acts as a safety mechanism to avoid over-consumption in the wireless device 12 at a later stage. The decision can also be based on other information about the wireless device 12, for example what proportion of the pre-fetched content that wireless device 12 has historically consumed. This approach helps avoid wasting network resources by not pre-fetching content of a type or content source that historically is not consumed by the wireless device 12, or by its associated subscriber. On the other hand, the historical data may indicate that the content at issue for pre-fetching is of a type or content source that has a strong historical consumption at the wireless device 12, or by its associated subscriber.

At Step 5, if the pre-fetching request is granted, the AF node 28 performs the necessary signaling towards the pre-fetching element 20 in the wireless device 12, in order to set up the pre-fetching flow. For example, the AF node 28 informs the pre-fetching element 20 regarding IP addresses and port numbers associated with the content to be pre-fetched to the wireless device 12.

Steps 1-5 may be understood as representing an embodiment of the aforementioned method 300. Further, at Step 6, the pre-fetching AF node 28 also informs the PCRF node 40 regarding the pre-fetching flow, while at Step 7, the PCRF node 40 informs the PCEF node 42 regarding the zero-charging rule for the pre-fetching flow. That is, such signaling indicates that charging for the pre-fetched content will be assessed as a matter of later actual consumption of the pre-fetched content at the wireless device 12, e.g., actual playback of pre-fetched video content, rather than based on the pre-fetching flow.

At Step 8, the content in question is pre-fetched from the CP 36, which could be an external content provider server on the Internet. Alternatively, the CP 36 here represents local storage within the network 10, e.g., which stores content for pre-fetching to wireless devices 12 operating in the network 10.

At Step 9, which occurs at some later time, which could be hours or even days later, an application 54 in the wireless device 12 requests consumption of all or part, e.g., a chunk, of the pre-fetched content. The request is sent internally within the wireless device 12 to the pre-fetch controller 50, for example, which sends it towards the AF node 28 via the communication interface 14 included in the wireless device 12. In one use case, the application 54 is a movie-viewing application. The consumption request in turn is triggered by a user of the wireless device 12 using the movie application to select a specific movie, which was earlier pre-fetched from the CP 36. In another case, the consumption request is triggered by the user using the wireless device 12 to navigate to a specific URL with a web browser, where the associated content has been at least partly pre-fetched to the wireless device 12.

At Step 10, if the wireless device 12 is in a Connected Mode, the local pre-fetch controller 50 sends a consumption request message towards the network 10, detailing the content that the application 54 has requested, and optionally also attaches additional parameters bearing on the content and/or the assessment of charges. Example parameters include any one or more of the following: an identifier of the content, including any chunk-specific identifiers; a size of the content, including any chunk-size information, the current RAT through which the wireless device 12 is connected; a current location of the wireless device 12; the time at which the pre-fetched content was pre-fetched to the wireless device 12; the RAT and RAN used for pre-fetching; a current time; a mobility record or estimate for the wireless device 12, as applicable during pre-fetching or as applicable to the requested consumption; and the reason(s) or basis for pre-fetching the content to the wireless device 12—e.g., whether the content was requested specifically or pushed prospectively.

At Step 11, the AF 28 checks with the OCS 38, to determined whether the consumption request can be at least partially granted. To do so, the AF node 28 performs a Credit Control procedure towards the OCS 38, including sending a Credit Control Request, CCR, and receiving a corresponding Credit Control Answer, CCA. All parameters needed by the OCS Rating Function to compute the amount of units needed for the requested consumption is included in the CCR message. Again, for example, such data includes the size or length of the content requested for consumption, the RAT/RAN type of identity through which the content was pre-fetched, etc.

At Step 12, the OCS 38 responds with the CCA message, either granting or rejecting the requested content consumption. The corresponding number of credits or other units needed to satisfy the requested consumption also may be deducted from the associated subscriber account.

At Step 13, the AF node 28 notifies the local pre-fetch controller 50 in the wireless device 12 whether or to what extent the pre-fetched content can be consumed. This notification is based on the AF node 28 sending a Consumption Response message to the wireless device 12. It will be appreciated that Steps 11-13, in conjunction with a consumption request reception in relation to Step 10, correspond to one implementation of the method 200 introduced by way of example in FIG. 2.

At Step 14a, in case the Consumption Response message grants at least partial consumption of the pre-fetched content, the local pre-fetch controller 50 forwards the consumption response to the requesting application 54, and at Step 14b notifies or signals the local pre-fetch storage 52 for release of the pre-fetched content in accordance with the granted consumption. As a consequence, at Step 15, at least the granted portion of the pre-fetched content is transported from the local pre-fetched storage 52 to the requesting application 54, e.g., for playback to the user of the wireless device 12, and at Step 16, the content is consumed via the requesting application 54.

Thus, the AF node 28 is responsible for performing a Charging Control procedure towards the OCS 38, in response to the AF node 28 receiving a consumption request from a wireless device 12, for the consumption of all or part of content that was pre-fetched to the wireless device 12 in advance of charging. The procedure includes sending a CCR towards the OCS 38 for content "X", attaching all the parameters needed for the OCS Rating Function to compute the amount of units needed for consumption of content X. Such information may be included in the "service-information" field of the CCR message. The Rating Function needs to know the policies pre-fetched content charging in various.

If the CCR/CCA procedure is successful, the AF node 28 sends a Consumption Granted response to the wireless device 12, indicating that the consumption request is granted in whole or in part. If the CCR/CCA procedure fails—for example if the associated subscriber account does not have enough credit to cover the requested consumption—the AF node sends a Consumption Rejected response to the pre-fetching element 20, indicating that the consumption request is denied.

The pre-fetched content may be protected so that it cannot be consumed in the wireless device 12 without the network being aware of the consumption. In one approach, the pre-fetched content is encrypted and communication with the network is necessary for decryption. For example, a key or other decryption information is provided in the Consumption Response message from the AF node 28 to the wireless device 12.

Further, the wireless device 12 in some embodiments is configured to provide consumption reports to the network 10, e.g., to the AF node 28, if the pre-fetched content is consumed offline when the wireless device 12 is disconnected from the network 10. The consumption reports can also be used for reporting to the network 10 information about pre-fetched content that has been deleted from the wireless device 12 without being consumed. In one or more such embodiments, the AF node 28 is configured to provide the pre-fetching element 20 in the wireless device 12

Further, in some embodiments, the AF node 28 is configured to provide instructions to the pre-fetching element 20 in the wireless device 12, indicating how much pre-fetched content can be consumed while the wireless device 12 is disconnected. Such information is communicated, for example, in a consumption allowance message. Note, too, that the AF node 28 in some embodiments is configured to periodically poll the OCS 38, for the current credit status of the subscriber account associated with any given wireless device 12 to which content has been pre-fetched. Such information can be used, e.g., to update the consumption allowance of the wireless device 12.

For example at time t1, the AF node 28 sends a CCR to the OCS 38 and gets a response that the associated subscriber account has 100 credits. Based on this credit, the AF node 28 sends a consumption allowance message, indicating that the wireless device 12 is permitted to consume a portion of pre-fetched content corresponding to 50 credits while in the disconnected mode. At a later time t2, the AF node 28 learns that the associated subscriber account has only 60 credits left. In response, the AF node 28 sends a new consumption allowance message indicating that the wireless device 12 is permitted to consume only 30 credits worth of pre-fetched content while in the disconnected mode.

In some embodiments, such consumption allowance messages include a parameter indicating the duration for which the allowance is valid. For example, the allowance expires after 48 hours in the disconnected mode. Note, too, that "chunking" or otherwise quantizing an item of pre-fetched content into smaller sub-parts or sections, each of which is consumable and chargeable on a piecemeal basis, complements consumption allowance control by the network 10. In this respect, consumption allowances may be indicated in terms of byte count, or playback durations, or for certain content, in terms of playback markers or points—e.g., chapter or scene identifiers associated with a pre-fetched movie.

In order to enable flexible charging while in Disconnected mode the AF can use the unit of "money" in the Consumption allowance message, and also include in the message a definition of how to convert a specific content chunk to money. Basically the rating rules as enforced by the Rating Function in the OCS need to be provided to the UE (or at least a simplified version of them).

Thus, the AF node 28 in one or more embodiments performs processing and controls with respect to content pre-fetching that prevents or limits the risk of over-consumption of pre-fetched content by a wireless device 12 that is in a disconnected mode during content consumption. More broadly, the AF node 28 as configured in one or more embodiments herein determines whether to permit content pre-fetching in dependence on receiving a pre-fetching request from a wireless device 12, or from some other entity involved in initiating the pre-fetching of certain content to a wireless device 12. In response to the pre-fetching request, the AF node 28 initiates a credit balance check with the OCS 38, and conditions the requested pre-fetching of the content to the wireless device 12 on the corresponding credit balance response received from the OCS 38. The AF node 28 may base its pre-fetching allowance decision on additional information, such as by considering historical consumption information associated with the wireless device 12 and/or the involved subscriber account.

In at least some embodiments, the AF node 28 is configured to interact with the OCS 38, to reserve credit in the associated subscriber account as part of allowing content pre-fetching to a given wireless device 12. Credit reservation means that the credits are reserved and cannot be used for any other services chargeable to the subscriber account. However, the AF node 28 may be configured so that credit reservations are required only if certain conditions are met, e.g., in cases where it is known that a user of the wireless device 12 initiated the pre-fetching, or in cases where the pre-fetching is done as part of an ongoing subscription agreement, etc. Further, in at least one such embodiment, the AF node 28 is configured to receive consumption information indicating the amounts or portions of pre-fetched content that were actually consumed at the wireless device 12, and to send corresponding information to the OCS 38, for reconciliation of final charges, e.g., partial charges for partial consumption, and crediting back of any unused reserved credits to the subscriber account.

This alternative could be an option if the end-user is aware of the pre-fetching mechanism, and, for example, chooses a number of movies from a list to be available for later viewing in the disconnected mode. At pre-fetching, credit is reserved from the user's account for all movies, but when the user returns to Connected mode and sends the Consumption Reports only the consumed movies are charged and the credits reserved for the other movies are returned to the account.

However, if the pre-fetching is transparent to the user (e.g. the network predicts and pre-fetches content that the user is likely to consume), reserving credit for all the pre-fetched content is probably not feasible since it might limit other service usage for the user. For example the user is unable to make a phone call because the network has pre-fetched a lot of content to the UE, transparently to the user.

Figure 6:
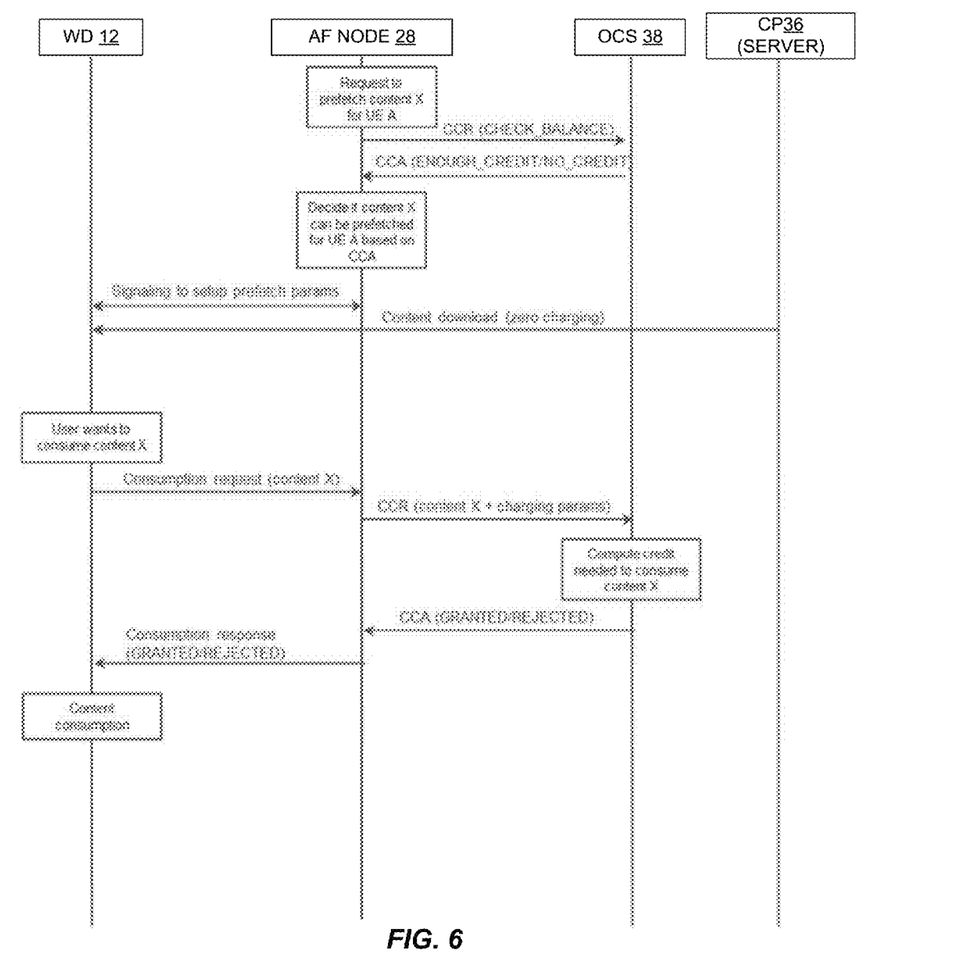
FIGS. 6 and 7 are example flow diagrams according to online and offline content consumption scenarios, for pre-fetched content.
Figure 7:
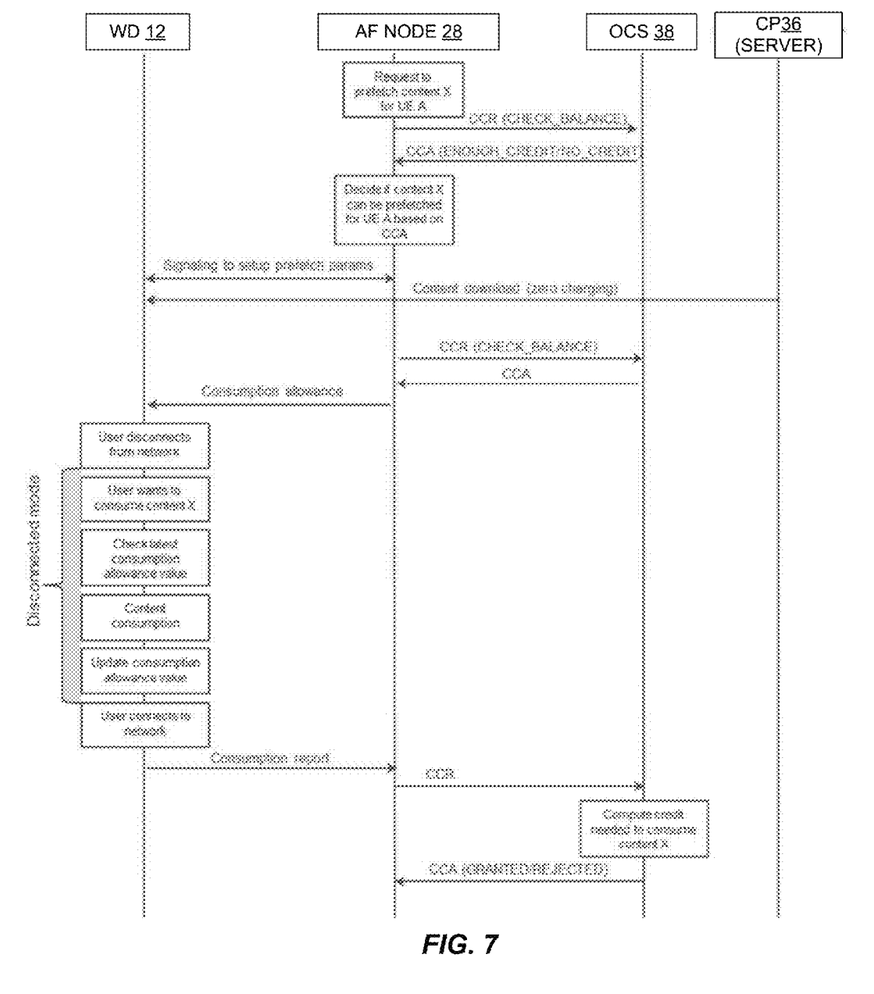

FIGS. 6 and 7 provide signal flow examples for a connected-mode consumption scenario and for a disconnected-mode consumption scenario, respectively. While the signal flow in FIG. 6 is relatively straightforward and can be understood as corresponding to the previously discussed methods 200 and 300 of FIGS. 2 and 3, it should be understood that additional signaling may follow the consumption of the pre-fetched content at the wireless device 12. For example, in cases of partial consumption, a consumption report or other such indication may be sent from the wireless device 12 to the AF node 28, for reconciliation of charges. It should also be understood that the CCAs and consumption grants may be decided and generated on a per-chunk basis, in cases where the pre-fetched content involved in a consumption request is chargeable in discrete chunks or blocks.

To enable flexible charging policies for pre-fetched content, the Rating Function, RF, of the OCS 38 must be able to perform rating based on a number of different input parameters, as provided in the CCR message sent from the AF node 28. The input parameters are, for example, one or several of the parameters signaled in the Consumption Request/Response messages, e.g., data size, time of download and/or consumption, RAT/RAN used for download and/or consumption, location of the wireless device 12 at the time of download and/or consumption etc. The RF is provisioned with the rules needed to convert from these input parameters to a specific rate, for example via a management interface.

To enable disconnected-mode rating in the wireless device 12, there must be a mechanism for accessing at least simplified rating rules regarding pre-fetched content. In one embodiment, the CCA message provides such a mechanism, e.g. in the "service-information" field of that message. Such rating information is included in the CCA if, for example, a parameter in the CCR message indicates that the information is needed.

With this in mind, the initial portion of FIG. 7 mirrors the signaling flow and functionality of FIG. 6 for initial pre-fetching of content to the wireless device 12. However, in FIG. 7, the AF node 28 sends a consumption allowance message to the wireless device 12 in response to receiving a positive CCA from the OCS 38. The consumption allowance tells the wireless device 12 whether and to what extent offline consumption is permitted for the involved pre-fetched content. As such, the pre-fetching element 20 in the wireless device 12 conditions the consumption of the pre-fetched content during the disconnected mode, in accordance with the consumption allowance, and provides a consumption report to the AF node 28 once the wireless device 12 reconnects to the network 10. These operations involve the pre-fetching element 20 deducting from the consumption allowance as a function of user-requested or actual consumption of the pre-fetched content at the wireless device 12.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of supporting online charging for content that was pre-fetched to a wireless device via a communication network, said method implemented at a network node associated with the communication network and comprising:
    receiving a consumption request indicating a requested consumption for at least a portion of the pre-fetched content at the wireless device;
    initiating a credit control procedure towards an online charging system in response to receiving the consumption request, including:
        identifying the requested consumption to the online charging system in an online charging request sent from the network node to the online charging system; and
        receiving an online charging response from the online charging system indicating whether or to what extent the requested consumption is authorized; and
    sending a consumption response for the wireless device granting or denying all or a portion of the requested consumption, according to the charging response.

2. The method of claim 1, wherein the consumption request indicates one or more charging factors affecting charging assessment by the online charging system with respect to the requested consumption, and wherein the method further comprises indicating the one or more charging factors to the online charging system via the online charging request.

3. The method of claim 2, wherein the one or more charging factors comprise at least one of: an indication of the time at which the pre-fetched content was pre-fetched to the wireless device, an indication of the Radio Access Technology, RAT, type used to pre-fetch the pre-fetched content to the wireless device, an indication of the identity of the Radio Access Network, RAN, used to pre-fetch the pre-fetched content to the wireless device, an indication of the location of the wireless device when the pre-fetched content was pre-fetched to the wireless device, and an indication of network loading for a service area in which the wireless device was located when the pre-fetched content was pre-fetched to the wireless device.

4. The method of claim 1, wherein the pre-fetched content is divided into chargeable chunks and wherein receiving the consumption request comprises receiving a chunk-specific consumption request, and wherein identifying the requested consumption in the online charging request comprises identifying the chunk of the pre-fetched content that corresponds to the chunk-specific consumption request.

5. The method of claim 1, wherein identifying the requested consumption to the online charging system in the online charging request sent from the network node to the online charging system includes indicating to the online charging system at least one of the following charging factors: a data amount or size corresponding to the requested consumption, a length or duration of playback associated with the requested consumption, an indication of a particular portion or segment of the pre-fetched content targeted by the requested consumption, and a Radio Access Network, RAN, identity or type corresponding to a current location of the wireless device.

6. The method of claim 1, further comprising:
    in advance of receiving the consumption request, receiving a pre-fetching request, requesting pre-fetching of content to the wireless device, said content becoming said pre-fetched content upon completion of pre-fetching to the wireless device;
    initiating a credit balance check with the online charging system responsive to receiving the pre-fetching request; and
    conditioning the requested pre-fetching of the content to the wireless device on a credit balance response received from the online charging system.

7. The method of claim 6, wherein conditioning the requested pre-fetching of the content to the wireless device comprises at least one of: limiting an amount of the content that is pre-fetched to the wireless device according to a credit balance indicated by the credit balance response, authorizing the requested pre-fetching of the content to the wireless device if the indicated credit balance is above a first threshold amount, and denying the requested pre-fetching of the content to the wireless device if the indicated credit balance is below a second threshold amount.

8. The method of claim 6, further comprising, for the case where the requested pre-fetching is at least partially allowed, indicating the requested pre-fetching to a Policy and Charging Rules Function, PCRF, node and initiating the requested pre-fetching.

9. A network node configured for operation as an Application Function, AF, in a communication network, and further configured to support online charging for content that was pre-fetched to a wireless device via the communication network, said network node comprising:
    a communication interface; and
    a processing circuit configured to:
        receive a consumption request via the communication interface, said consumption request indicating a requested consumption for at least a portion of the pre-fetched content at the wireless device;
        initiate a credit control procedure towards an online charging system, in response to receiving the consumption request, including:
            identify the requested consumption to the online charging system in an online charging request sent from the network node to the online charging system via the communication interface; and
            receive an online charging response from the online charging system via the communication interface, said charging response indicating whether or to what extent the requested consumption is authorized; and
        send a consumption response for the wireless device via the communication interface, said consumption response granting or denying all or a portion of the requested consumption, according to the charging response.

10. The network node of claim 9, wherein the consumption request indicates one or more charging factors affecting charging assessment by the online charging system with respect to the requested consumption, and wherein the processing circuit is configured to indicate the one or more charging factors to the online charging system via the online charging request.

11. The network node of claim 10, wherein the one or more charging factors comprise at least one of: an indication of the time at which the pre-fetched content was pre-fetched to the wireless device, an indication of the Radio Access Technology, RAT, type used to pre-fetch the pre-fetched content to the wireless device, an indication of the identity of the Radio Access Network, RAN, used to pre-fetch the pre-fetched content to the wireless device, an indication of the location of the wireless device when the pre-fetched content was pre-fetched to the wireless device, and an indication of network loading for a service area in which the wireless device was located when the pre-fetched content was pre-fetched to the wireless device.

12. The network node of claim 9, wherein the pre-fetched content is divided into chargeable chunks and wherein the consumption request comprises a chunk-specific consumption request, and wherein the processing circuit is configured to indicate the chunk-specific consumption request in the online charging request.

13. The network node of claim 9, wherein the processing circuit is configured to indicate to the online charging system at least one of the following charging factors associated with the consumption request: a data amount or size corresponding to the requested consumption, a length or duration of playback associated with the requested consumption, an indication of a particular portion or segment of the pre-fetched content targeted by the requested consumption, and a Radio Access Network, RAN, identity or type corresponding to a current location of the wireless device.

14. The network node of claim 9, wherein the processing circuit is configured to:

receive a pre-fetching request sometime before receiving the consumption request, wherein the pre-fetching request requests pre-fetching of content to the wireless device, said content becoming said pre-fetched content upon completion of pre-fetching to the wireless device;

initiate a credit balance check with the online charging system responsive to receiving the pre-fetching request; and condition the requested pre-fetching of the content to the wireless device on a credit balance response received from the online charging system.

15. The network node of claim 14, wherein the processing circuit is configured to condition the requested pre-fetching of the content to the wireless device by at least one of: limiting an amount of the content that is pre-fetched to the wireless device according to a credit balance indicated by the credit balance response, authorizing the requested pre-fetching of the content to the wireless device if the indicated credit balance is above a first threshold amount, and denying the requested pre-fetching of the content to the wireless device if the indicated credit balance is below a second threshold amount.

16. The network node of claim 14, wherein, for the case where the requested pre-fetching is at least partially allowed, the processing circuit is configured to indicate the requested pre-fetching to a Policy and Charging Rules Function, PCRF, node and initiate the requested pre-fetching.

\* \* \* \* \*